United States Patent  
Kim

(10) Patent No.: US 10,477,533 B2
(45) Date of Patent: Nov. 12, 2019

(54) METHOD FOR MUST TRANSMISSION SCHEDULING IN WIRELESS COMMUNICATION SYSTEM AND APPARATUS THEREFOR

(71) Applicant: LG ELECTRONICS INC., Seoul (KR)

(72) Inventor: Hyungtae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/754,878

(22) PCT Filed: Aug. 25, 2016

(86) PCT No.: PCT/KR2016/009404
§ 371 (c)(1),
(2) Date: Feb. 23, 2018

(87) PCT Pub. No.: WO2017/034329
PCT Pub. Date: Mar. 2, 2017

(65) Prior Publication Data
US 2018/0242288 A1 Aug. 23, 2018

Related U.S. Application Data

(60) Provisional application No. 62/222,164, filed on Sep. 22, 2015, provisional application No. 62/209,846, filed on Aug. 25, 2015.

(51) Int. Cl.
H04W 72/04 (2009.01)
H04W 76/11 (2018.01)
(Continued)

(52) U.S. Cl.
CPC ......... H04W 72/042 (2013.01); H04L 5/0053 (2013.01); H04L 5/0064 (2013.01);
(Continued)

(58) Field of Classification Search
CPC ..... H04W 72/042; H04L 5/001; H04L 5/0053
See application file for complete search history.

(56) References Cited

U.S. PATENT DOCUMENTS 9,014,179 B2 * 4/2015 Li ..................... H04L 5/0003
370/357
9,698,886 B2 * 7/2017 Morita ................ H04B 7/10

FOREIGN PATENT DOCUMENTS

KR 10-2008-0084409 A 9/2008
KR 10-2011-0007145 A 1/2011
(Continued)

OTHER PUBLICATIONS

3rd Generation Partnership Project, "Technical Specification Group Radio Access Network; Study on Downlink Multiuser Superposition Transmission (MUST) for LTE; (Release 13)," 3GPP TR 36.859, V0.2.0, May 2015, pp. 1-13.

Primary Examiner — Chandrahas B Patel
(74) Attorney, Agent, or Firm — Birch, Stewart, Kolasch & Birch, LLP

(57) ABSTRACT

The present application discloses a method for receiving, by a terminal, a downlink signal from a base station in a wireless communication system. Specifically, the method comprises: receiving a downlink control signal comprising first control information for a first band and second control information for a second band; receiving a first downlink data signal on the first band on the basis of the first control information; and receiving a second downlink data signal multiplexed with a downlink signal for a paired terminal on the second band on the basis of the second control information, wherein the second control information comprises identification information for distinguishing the second downlink data signal from the downlink signal for the paired terminal.

10 Claims, 9 Drawing Sheets

(51) Int. Cl.
*H04L 5/00* (2006.01)
*H04L 27/34* (2006.01)
(52) U.S. Cl.
CPC ........... *H04L 5/0091* (2013.01); *H04W 76/11* (2018.02); *H04L 5/0023* (2013.01); *H04L 27/34* (2013.01)

(56) References Cited

FOREIGN PATENT DOCUMENTS

WO    WO 2012/102510 A2    8/2012
WO    WO 2015/068968 A1    5/2015

\* cited by examiner

FIG. 2
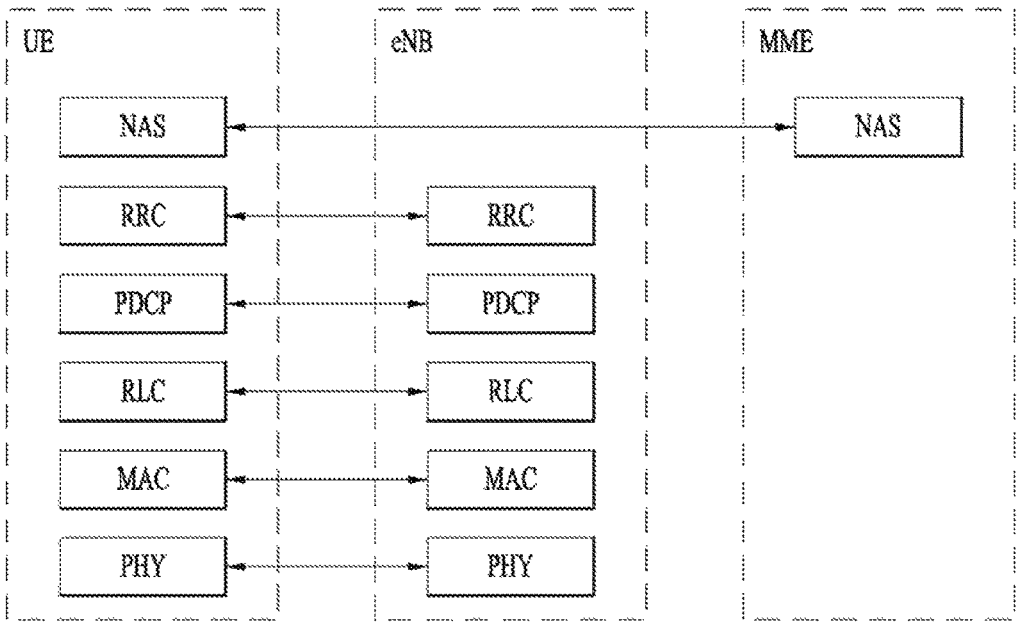
(a) Control-Plane Protocol Stack
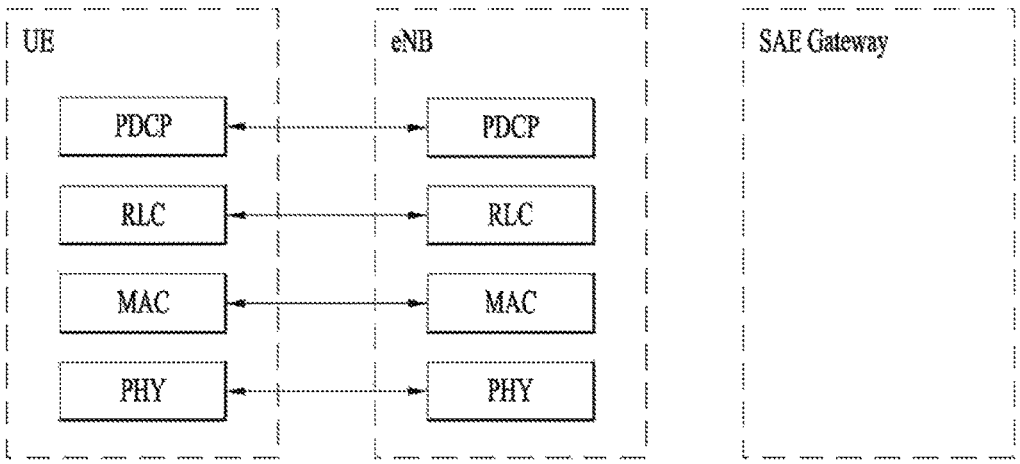
(b) User-Plane Protocol Stack

METHOD FOR MUST TRANSMISSION SCHEDULING IN WIRELESS COMMUNICATION SYSTEM AND APPARATUS THEREFOR

CROSS REFERENCE TO RELATED APPLICATIONS

This application is the National Phase of PCT International Application No. PCT/KR2016/009404, filed on Aug. 25, 2016, which claims priority under 35 U.S.C. 119(e) to U.S. Provisional Application No. 62/209,846, filed on Aug. 25, 2015 and 62/222,164, filed on Sep. 22, 2015, all of which are hereby expressly incorporated by reference into the present application.

TECHNICAL FIELD

The present invention relates to a wireless communication system, and more particularly, to a scheduling method for multi-user superposition transmission (MUST) in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

In light of the above discussion, the present invention provides a scheduling method for MUST in a wireless communication system and apparatus therefor.

Technical Solutions

In an aspect of the present invention, provided herein is a method for receiving downlink signals from an evolved node B (eNB) by a user equipment (UE) in a wireless communication system, including: receiving a downlink control signal including first control information on a first band and second control information on a second band; receiving a first downlink data signal on the first band based on the first control information; and receiving a second downlink data signal multiplexed with a downlink signal for a paired UE on the second band based on the second control information. In this case, the second control information may include identification information for distinguishing between the second downlink data signal and the downlink signal for the paired UE.

In another aspect of the present invention, provided herein is a user equipment (UE) in a wireless communication system, including: a wireless communication module; and a processor configured to receive a downlink control signal including first control information on a first band and second control information on a second band, receive a first downlink data signal on the first band based on the first control information, and receive a second downlink data signal multiplexed with a downlink signal for a paired UE on the second band based on the second control information. In this case, the second control information may include identification information for distinguishing between the second downlink data signal and the downlink signal for the paired UE.

Preferably, the first downlink control information may include information on a first modulation and coding scheme (MCS) level for the first downlink data signal, and the second downlink control information may include information on a second MCS level for the second downlink data signal. In this case, if the first MCS level is identical to the second MCS level, the identification information may include ratio information between transmission power of the second downlink data signal and transmission power of the downlink signal for the paired UE.

Preferably, the second control information may include a flag bit indicating whether the second downlink data signal is multiplexed with the downlink signal for the paired UE.

More preferably, the second downlink data signal and the downlink signal for the paired UE may be multiplexed on the same time and frequency resources. In addition, the UE may be located close to the eNB, and the paired UE may be located away from the eNB.

Advantageous Effects

According to embodiments of the present invention, scheduling for MUST can be efficiently performed in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification;

BEST MODE FOR INVENTION

Figure 1:
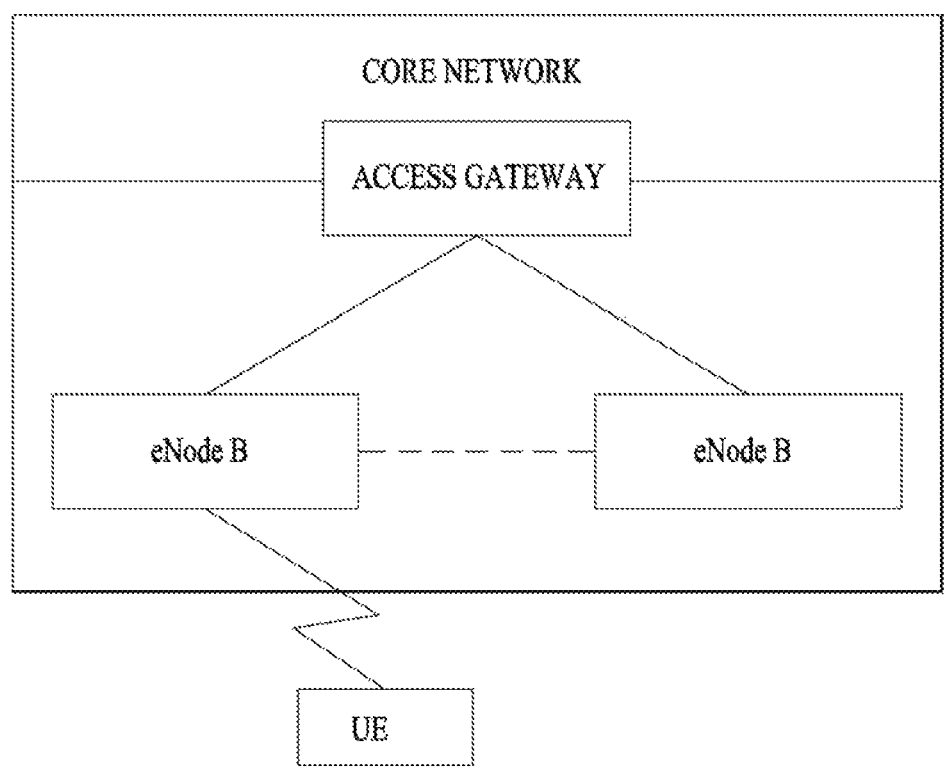
FIG. 1 is a diagram schematically illustrating a network structure of an evolved universal mobile telecommunications system (E-UMTS) as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell managed by an eNB is configured to operate in one of the bandwidths of 1.25, 2.5, 5, 10, 15 and 20 Mhz and provide downlink (DL) or uplink (UL) transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
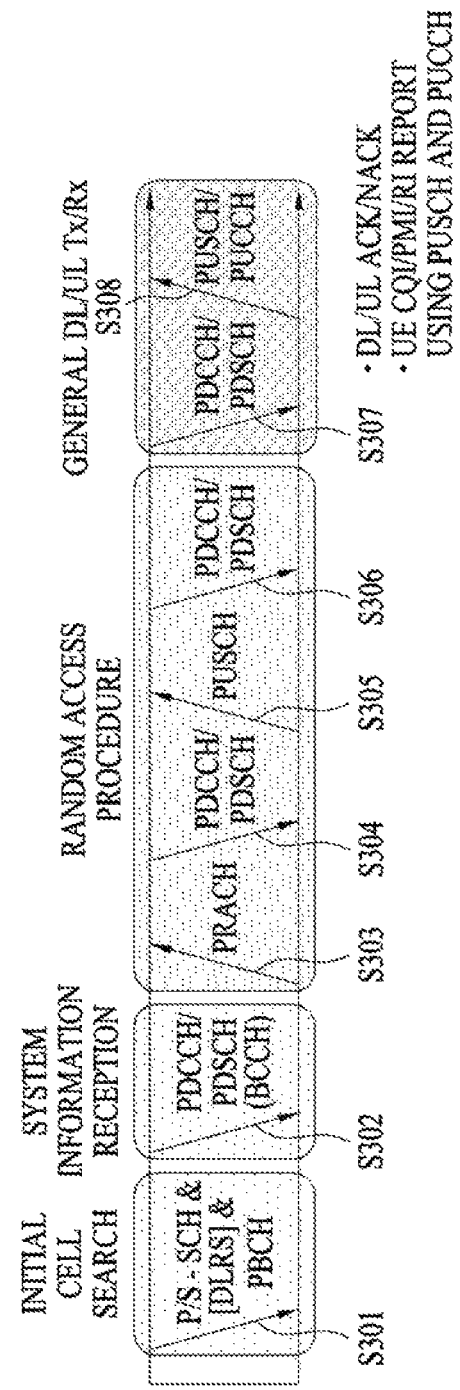
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
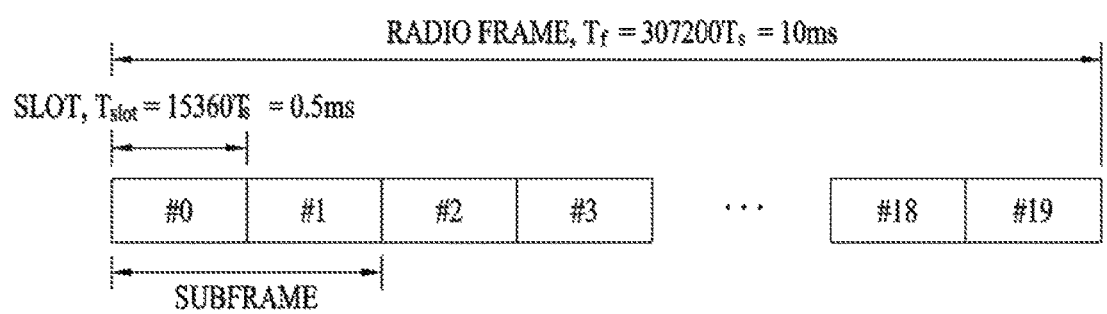
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
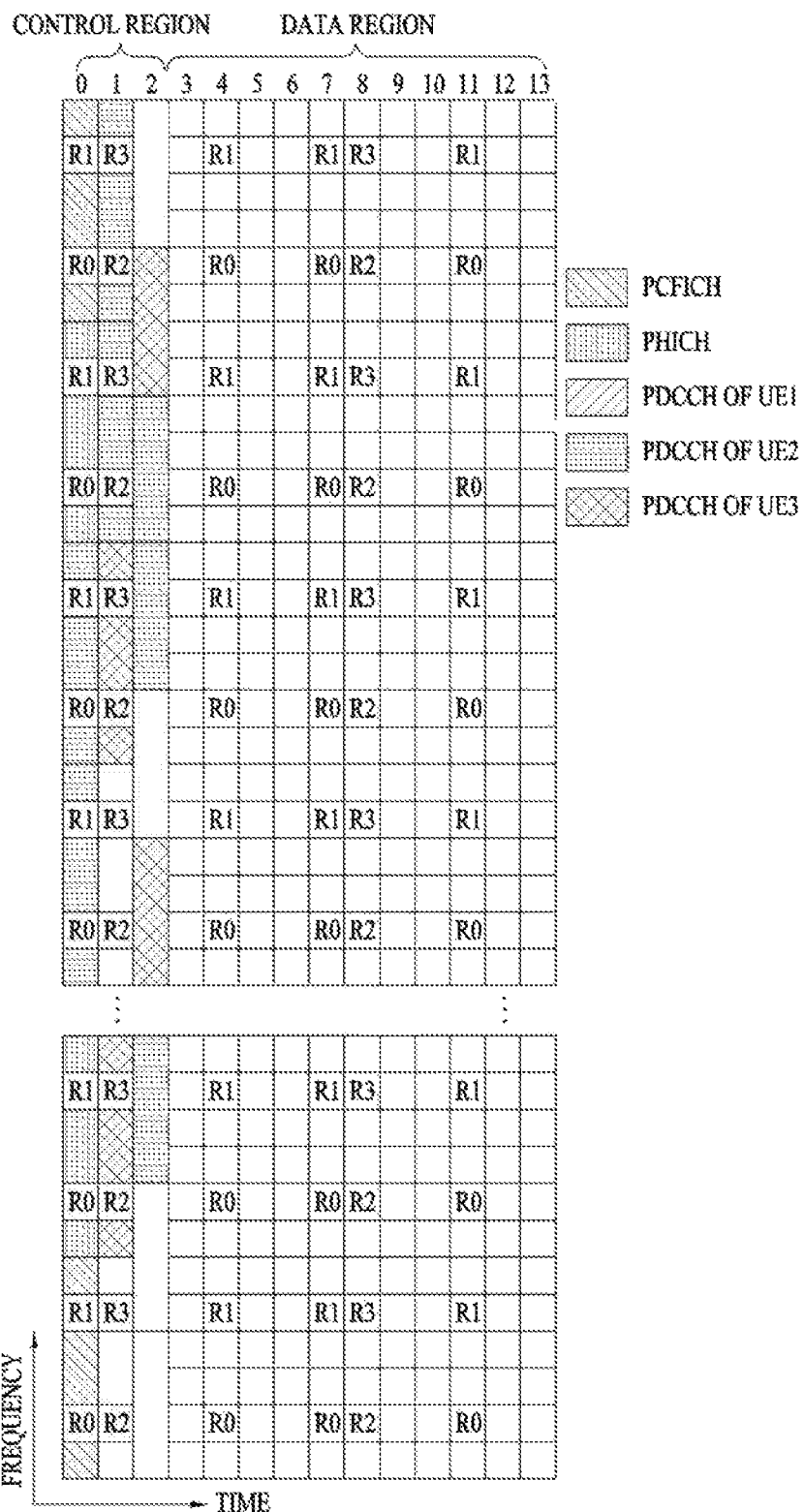
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDCCH indicated by 'B' and 'C' based on the received information of the PDCCH.

Figure 6:
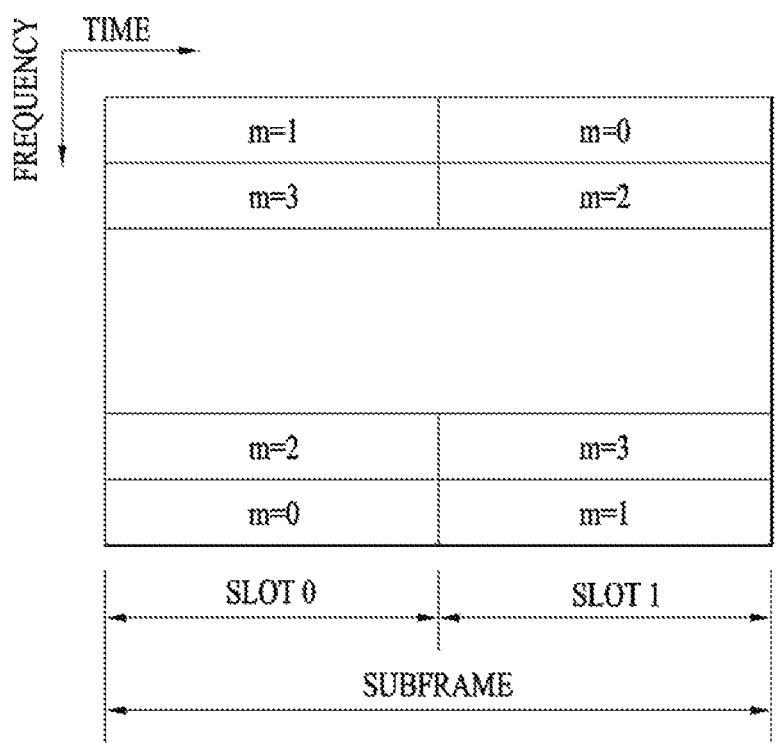
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

The present invention provides a method for performing signaling and specific operations required for an interference cancellation receiver in a multi-user superposition transmission (MUST) system. MUST refers to a multiple access scheme that may achieve high bandwidth efficiency by allocating a plurality of UEs to the same frequency-time resources using a preset power ratio and mitigating preset inter-user interference, basically based on the premise that a signal is transmitted to the interference cancellation receiver, in addition to time-frequency domain resource allocation of a legacy OFDMA system. MUST is under discussion as a significant candidate technology for a future 5th generation (5G) system.

Resource allocation of an eNB and interference cancellation of a UE are important techniques in the MUST system. Particularly, receivers may be classified into symbol level interference cancellation (SIC) receivers represented by a maximum likelihood (ML) receiver, and codeword level interference cancellation (CWIC) receivers represented by a minimum mea-square error (MMSE)-based linear CWIC (L-CWC) receiver and an ML-CWC receiver, depending on their interference cancellation schemes. A reception gain is different in a given environment according to each interference cancellation scheme. In general, an ML receiver and a CWIC receiver achieve high gains in proportion to the implementation complexity of a UE.

Figure 7:
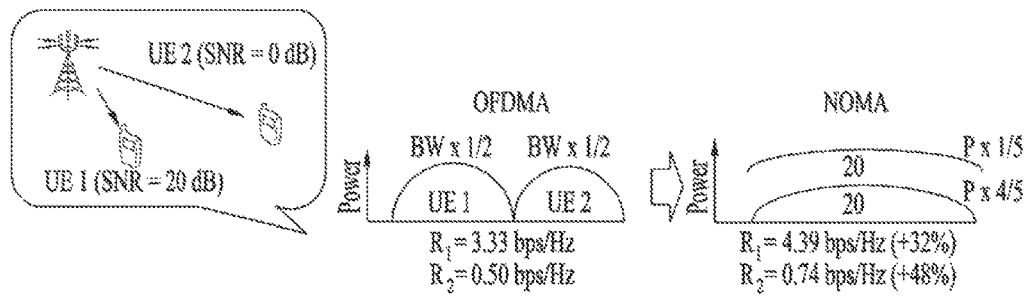
FIGS. 7 and 8 are conceptual views illustrating an interference cancellation scheme in a multi-user superposition transmission (MUST) system.
Figure 8:
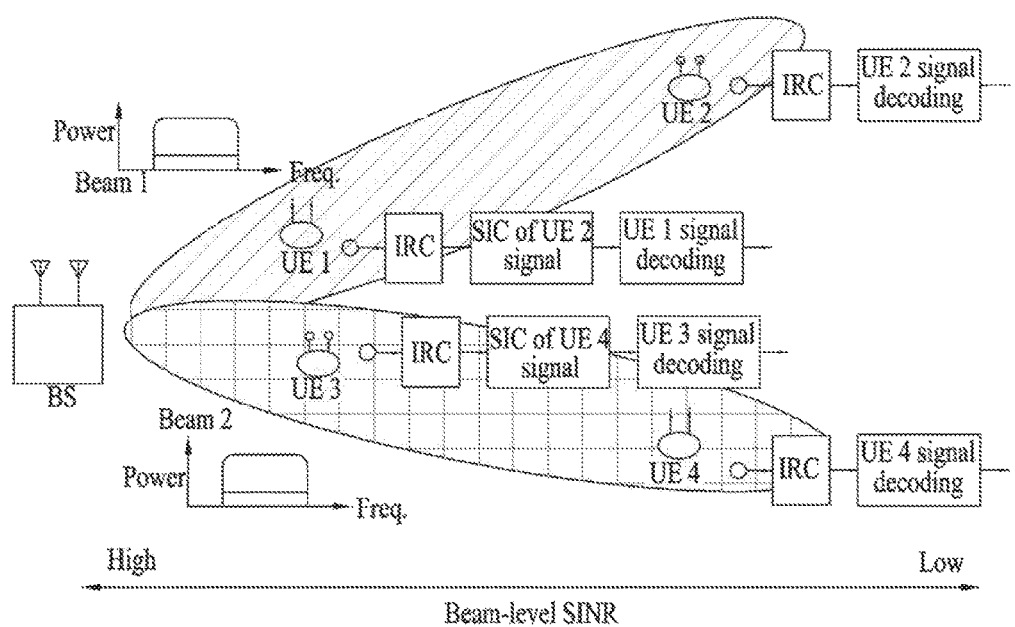

FIGS. 7 and 8 are conceptual views of an interference cancellation scheme in a MUST system.

FIG. 7 conceptually illustrates the difference between the legacy OFDMA system and the MUST system. Particularly, it is assumed in FIG. 7 that the signal to noise ratio (SNR) of a first UE (UE1) is 20 dB and the SNR of a second UE (UE2) is 0 dB.

Specifically, in the legacy OFDMA system, UE1 and UE2 receive DL signals with the same power, using equal halves of a bandwidth, that is, in different frequency bands. In this case, a data rate per frequency of UE1 is 3.33 bps/Hz and a data rate per frequency of UE2 is 0.5 bps/Hz. In the MUST system, each of UE1 and UE2 uses a total band. ⅘ of total transmission power is allocated to UE2, whereas ⅕ of the total transmission power is allocated to UE1. In this case, the data rate per frequency of UE1 is increased to 4.39 bps/Hz and the data rate per frequency of UE2 is increased to 0.74 bps/Hz.

FIG. 8 is a schematic view illustrating a signal reception operation in the MUST system. Specifically, an eNB transmits signals to which the same beamforming has been applied to UE1 and UE2 in the same time/frequency resources. In this case, although UE2 also receives a signal intended for UE1, the impact of the signal of UE1 is negligibly small because of a reception power difference. Thus, UE2 may decode a signal intended for UE2 simply by an interference rejection combining (IRC) algorithm. On the other hand, only after removing the transmission signal intended for UE2, that is, performing an SIC operation on the signal of UE2 in addition to the IRC algorithm, UE1 may decode the signal intended for UE1.

Likewise, the eNB transmits signals to which the same beamforming has been applied to a third UE (UE3) and a fourth UE (UE4) in the same time/frequency resources. In this case, although UE4 also receives a signal intended for UE3, the impact of the signal is negligibly small because of a reception power difference. Thus, UE4 may decode a signal intended for UE4 simply by the IRC algorithm. On the other hand, only after removing the transmission signal intended for UE4, that is, performing, an SIC operation on the signal of UE4 in addition to the IRC algorithm, UE3 may decode the signal intended for UE3.

Meanwhile, in MUST, information bits (or data) of a high-geometry UE, i.e., near UE and information bits (or data) of a low-geometry UE, i.e., far UE are converted into coded bits (code bits) by their own channel coding. Thereafter, the coded bits of the high-geometry UE and the coded bits of the low-geometry UE are transmitted on the same time/frequency resources using superposition coding. To this end, various implementation methods can be used.

As one MUST implementation method, it is possible to generate a constellation symbol, where information of both a high-geometry UE and a low-geometry UE are mixed, by multiplexing coded bits of the individual UEs and passing the multiplexed bits through a single modulator. For example, assuming that the coded bits of the high-geometry UE are 00 and the coded bits of the low-geometry UE are 11, the coded bits of the both UEs can be multiplexed in a concatenated manner to create 0011 bits, and then the bits may be mapped to the 16 QAM (quadrature amplitude modulation) constellation. Thereafter, layer mapping and precoding processes are applied to the constellation symbol, and then the constellation symbol is transmitted through an antenna. Such an implementation method may use the uniform constellation QAM modulator defined in the conventional LTE system.

Figure 9:
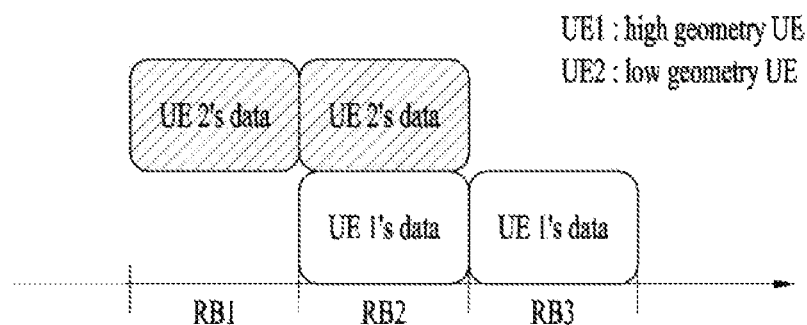
FIG. 9 illustrates an example in which a high geometry UE and a low geometry UE are scheduled for MUST.

FIG. 9 illustrates an example in which a high geometry UE and a low geometry UE are scheduled for MUST.

Referring to FIG. 9, it can be seen that MUST for two UEs, i.e., UE 1 and UE 2 is performed in RB 2, but data of UE 2 and data of UE 1 is respectively transmitted in RB 1 and RB 3. Since a modulation order or modulation and coding scheme (MCS) used in the RB where data is transmitted without MUST may be different from that used in the RB where MUST is performed, in the RB where data exits, each of UE 1 and UE 2 should perform decoding by applying a different modulation order or MCS according to whether MUST is applied.

To this end, an eNB should transmit information that allows UE 1 and UE 2 to distinguish between the RB where MUST is performed (hereinafter referred to as 'MUST RB') and the RB where MUST is not performed (hereinafter referred to as 'non-MUST RB'). In addition, it is desirable that the eNB also informs UE 1 and UE 2 of a modulation order or MCS to be used for the MUST RB and a modulation order or MCS to be used for the non-MUST RB. In this case, the eNB may inform the modulation order or MCS to be used for the MUST RB and then inform a change in the modulation order or MCS to indicate the modulation order or MCS to be used for the non-MUST RB. Alternatively, the eNB may inform the modulation order or MCS to be used for the non-MUST RB and then inform a change in the modulation order or MCS to indicate the modulation order or MCS to be used for the MUST RB.

In addition, if a UE knows the modulation order to be used for the MUST RB, the UE needs to be able to distinguish which bits among bits mapped to a corresponding constellation symbol correspond to UE's coded bits. To this end, the eNB may transmit relevant information to the UE.

Meanwhile, when each UE is restricted to use the same modulation order or MCS in both the non-MUST RB and the MUST RB, in the case of the MUST RB, each UE should perform decoding by distinguishing which bits among bits mapped to a constellation symbol correspond to each UE's coded bits, and in the case of the non-MUST RB, each UE performs decoding by interpreting all the bits mapped to the constellation symbol as each UE's coded bits. For example, when UE 1 receives a constellation symbol corresponding to '0011' in RB 2, UE 1 should recognize only '11' of '0011' as its coded bits. When UE 1 receives the constellation symbol corresponding to '0011' in RB 3, UE 1 should recognize the entirety of '0011' as its coded bits.

As another MUST implementation method, it is possible to respectively generate a constellation symbol of the high-geometry UE and a constellation symbol of the low-geometry UE by passing coded bits of the individual UEs through different modulators. Thereafter, different transmission power is allocated to the generated constellation symbols, and then the two constellation symbols are combined to a single constellation symbol.

For example, when the coded bits of the high-geometry UE are 00 and the coded bits of the low-geometry UE are 11, the coded bits of each UE may be mapped to the QPSK constellation. Next, different power is applied to constellation symbols that pass through individual modulators, and then the constellation symbols are combined. Thereafter, layer mapping and precoding processes are applied to the constellation symbols, and then the constellation symbols are transmitted through an antenna of the eNB.

Regarding the aforementioned second MUST implementation method, if the eNB schedules UE 1 and UE 2 as shown in FIG. 9, it is proposed that the eNB and UEs operate as follows.

Regardless of the MUST RB and the non-MUST RB, if each UE has the same modulation order/MCS in scheduled RBs, that is, if UE 1 has the same modulation order/MCS in RB 2 and RB 3 and UE 2 has the same modulation order/MCS in RB 1 and RB 2, each UE may assume that different transmission power is used for the MUST RB and the non-MUST RB. That is, since in RB 2, signals of UE 1 and UE 2 are transmitted through superposition, UE 1 may assume that some transmission power is for the UE 1's signal and the remaining transmission power is for the UE 2's signal. In this case, a ratio between data power and interference power is signaled to UE 1. Thereafter, UE 1 calculates the power for the UE 1's signal and the power for the UE 2's signal by applying the signaled ratio to RB 2, and then decodes its signal. On the other hand, since in RB 3, all transmission power is for the UE 1's signal, the UE perform decoding by assuming that all signal transmission power of the eNB is allocated as the UE 1's signal power without applying the signaled ratio between data power and the interference power.

Meanwhile, Table 1 below shows categories related to MUST schemes defined in the recent 3GPP standards.

TABLE 1

| | |
|---|---|
| Category 1 | Superposition transmission with adaptive power ratio on component constellations and non-Gray-mapped composite constellation |
| Category 2 | Superposition transmission with adaptive power ratio on component constellations and Gray-mapped composite constellation |
| Category 3 | Superposition transmission with label-bit assignment on composite constellation and Gray-mapped composite constellation |

According to Table 1, a UE receiving data through MUST (the UE is referred to as a MUST UE and the MUST UE may be a high-geometry UE or a low-geometry UE) requires assistance information to cancel interference caused by different UE's data, which is transmitted together with the MUST UE's data through superposition, (the different UE is referred to as a MUST-paired UE). The assistance information can be summarized as shown in Tables 2 to 4 in accordance with the categories in Table 1 and receiver types classified according to interference cancellation methods.

TABLE 2

| | | |
|---|---|---|
| Category 1 | R-ML | Existence of MUST interference<br>Layer index on which MUST transmission is applied<br>Modulation order of MUST paired UE<br>PDSCH transmission power allocation of MUST layers<br>Resource allocation of MUST paired UE<br>PDSCH RE mapping information of MUST paired UE<br>DMRS information of MUST paired UE<br>Transmission scheme of MUST paired UE<br>Precoding vector(s) of MUST paired UE |

TABLE 3

| | | |
|---|---|---|
| Category 2 | R-ML | Existence of MUST interference<br>Layer index on which MUST transmission is applied<br>Modulation order of MUST paired UE<br>PDSCH transmission power allocation of MUST layers<br>Resource allocation of MUST paired UE<br>PDSCH RE mapping information of MUST paired UE<br>DMRS information of MUST paired UE<br>Transmission scheme of MUST paired UE<br>Precoding vector(s) of MUST paired UE |
| | CWIC | The above potential MUST information for ML receiver<br>TBS of MUST paired UE<br>HARQ information of MUST paired UE<br>LBRM (Limited Buffer Rate Matching) assumption of MUST paired UE |

TABLE 3-continued

Parameters for descrambling and CRC checking
for the PDSCH of the MUST paired user

TABLE 4

| Category 3 | R-ML | Existence of MUST interference<br>Layer index on which MUST transmission is applied<br>Modulation order of MUST paired UE<br>Modulation order of composite constellation<br>Bit allocation information of composite constellation<br>PDSCH transmission power allocation of MUST layers<br>Resource allocation of MUST paired UE<br>PDSCH RE mapping information of MUST paired UE<br>DMRS information of MUST paired UE<br>Transmission scheme of MUST paired UE<br>Precoding vector(s) of MUST paired UE |
|---|---|---|
| | CWIC | The above potential MUST information for ML receiver<br>TBS of MUST paired UE<br>HARQ information of MUST paired UE<br>LBRM (Limited Buffer Rate Matching) assumption of MUST paired UE<br>Parameters for descrambling and CRC checking for the PDSCH of the MUST paired user |

The information shown in Tables 2 to 4 can be signaled by the eNB to the MUST UE through DCI. That is, the eNB may transmit the information to the MUST UE using a single piece of DCI (this is called MUST DCI) by adding a new field for the assistance information to the existing DCI. In this case, since whether MUST is performed or not is dynamically determined, the eNB dynamically transmits the existing DCI or the MUST DCI to the UE through a PDCCH. Eventually, since the UE cannot know whether MUST is performed until decoding the DCI, the UE should perform blind detection (BD) on both the existing DCI and the MUST DCI, and it may increase BD overhead and implementation complexity of the UE.

To overcome these problems, it is proposed that when an eNB intends to transmit DL data to a UE that reports its MUST capability, the eNB always transmit the MUST DCI. In addition, when the conventional normal transmission is performed rather than MUST (that is, when single-user MIMO transmission or multi-user MIMO transmission is performed), the eNB may perform zero padding on an assistance information field of the MUST DCI to inform the UE that MUST is not performed, and the UE may not analyze the assistance information field.

However, if zero-padding of the assistance information field indicates that there is valid assistance information, the above-mentioned proposal may not work correctly. For example, if a 2-bit power allocation value is defined as the assistance information field and if a state corresponding to a value of 00 indicates specific power allocation information, it is impossible to inform that MUST is not performed through zero padding.

In this case, a new bit or flag for informing whether MUST is performed may be added to the assistance information field. For example, when a 1-bit flag is defined, the eNB may set a value of the flag to 1 to inform that MUST has been performed, and the UE may cancel interference by analyzing the rest of the assistance information field. On the other hand, the eNB may set the flag value to 0 to inform that normal transmission has been performed, and the UE may not perform interference cancellation by ignoring the rest of the assistance information field.

Figure 10:
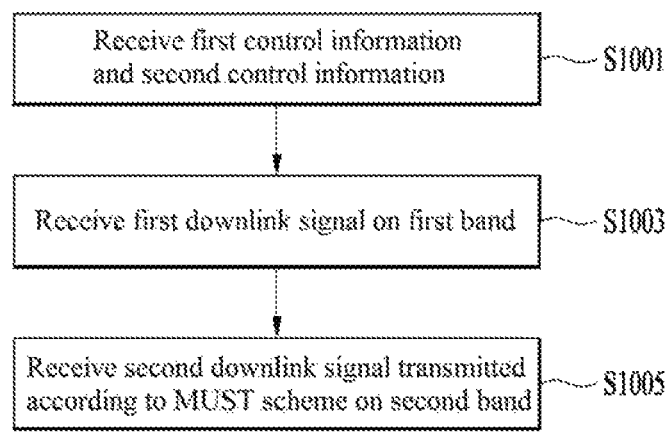
FIG. 10 is a flowchart illustrating a method performed by a UE for receiving a downlink signal from an eNB according to an embodiment of the present invention.

FIG. 10 is a flowchart illustrating a method performed by a UE for receiving a downlink signal from an eNB according to an embodiment of the present invention. In particular, it is assumed in FIG. 10 that downlink signals are received in a non-MUST RB (hereinafter referred to as a first band) and a MUST RB (hereinafter referred to as a second band) like the example of FIG. 9. In addition, it is preferably assumed that the UE is located close to the eNB and a paired UE, which will be described later, is located away from the eNB.

Referring to FIG. 10, in step 1001, the UE can receive, from the eNB, a downlink control signal including first control information on the first band and second control information on the second band. Preferably, identification information for distinguishing between a second downlink data signal and a downlink signal for the paired UE may be included. In addition, the second control information may include a flag bit indicating whether the second downlink data signal is multiplexed with the downlink signal for the paired UE.

Thereafter, in step 1003, the UE can receive a first downlink data signal on the first band based on the first control information. In step 1005, the UE can receive the second downlink data signal multiplexed with the downlink signal for the paired UE on the second band based on the second control information. Of course, the second downlink data signal and the downlink signal for the paired UE are multiplexed with each other on the same time and frequency resources, that is, the signals are transmitted according to the MUST scheme.

Additionally, the first downlink control information may include information on a first MCS level for the first downlink data signal, and the second downlink control information may include information on a second MCS level for the second downlink data signal. If the first MCS level is identical to the second MCS level, it is desirable that the identification information includes ratio information between transmission power of the second downlink data signal and transmission power of the downlink signal for the paired UE.

Figure 11:
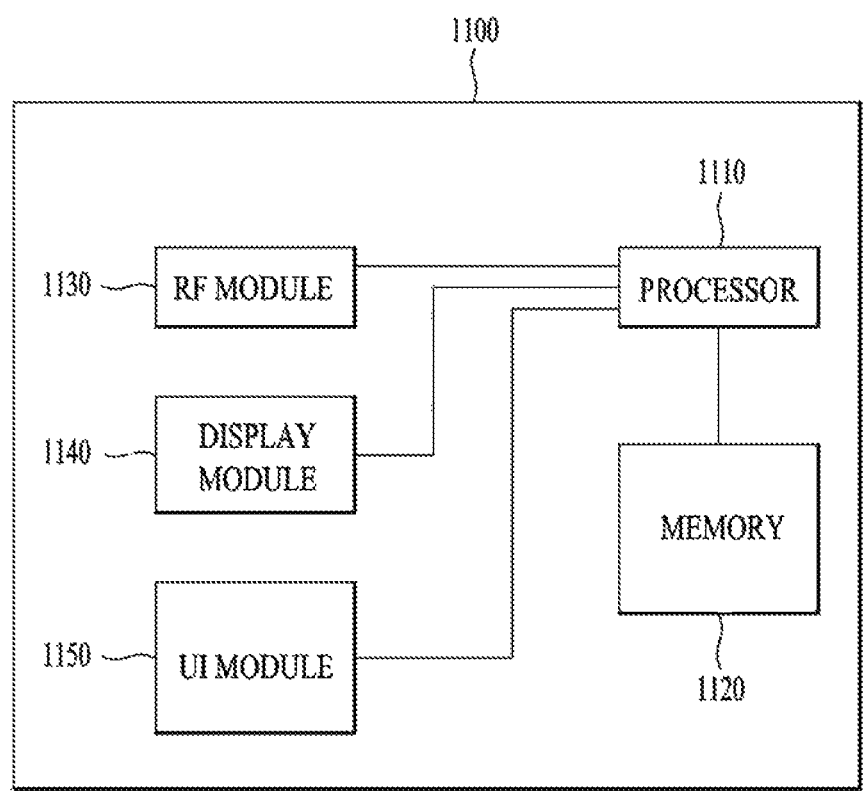
FIG. 11 is a block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the scheduling method for MUST in a wireless communication system and apparatus therefor are described with reference to examples applied to 3GPP LTE system, the method and apparatus can be applied to various wireless communication systems as well as the 3GPP LTE system.

What is claimed is:

1. A method for receiving downlink signals from an evolved node B (eNB) by a user equipment (UE) in a wireless communication system, the method comprising:
receiving a downlink control signal including first control information on a first band and second control information on a second band;
receiving a first downlink data signal on the first band based on the first control information; and
receiving a second downlink data signal multiplexed with a downlink signal for a paired UE on the second band based on the second control information,
wherein the second control information includes identification information for distinguishing between the second downlink data signal and the downlink signal for the paired UE, and
wherein the second downlink data signal and the downlink signal for the paired UE are multiplexed on the same time and frequency resources.

2. The method of claim 1, wherein the first control information includes information on a first modulation and coding scheme (MCS) level for the first downlink data signal, and
wherein the second control information includes information on a second MCS level for the second downlink data signal.

3. The method of claim 2, wherein if the first MCS level is identical to the second MCS level, the identification information includes ratio information between a transmission power of the second downlink data signal and a transmission power of the downlink signal for the paired UE.

4. The method of claim 1, wherein the second control information includes a flag bit indicating whether the second downlink data signal is multiplexed with the downlink signal for the paired UE.

5. The method of claim 1, wherein the UE is located close to the eNB, and
wherein the paired UE is located away from the eNB.

6. A user equipment (UE) in a wireless communication system, the UE comprising:
a wireless transceiver; and
a processor operatively coupled with the wireless transceiver, and configured to;
receive a downlink control signal including first control information on a first band and second control information on a second band,
receive a first downlink data signal on the first band based on the first control information, and
receive a second downlink data signal multiplexed with a downlink signal for a paired UE on the second band based on the second control information,
wherein the second control information includes identification information for distinguishing between the second downlink data signal and the downlink signal for the paired UE, and
wherein the second downlink data signal and the downlink signal for the paired UE are multiplexed on the same time and frequency resources.

7. The UE of claim 6, wherein the UE is located close to an evolved node B (eNB), and
wherein the paired UE is located away from the eNB.

8. The UE of claim 6, wherein the first control information includes information on a first modulation and coding scheme (MCS) level for the first downlink data signal, and wherein the second control information includes information on a second MCS level for the second downlink data signal.

9. The UE of claim 8, wherein if the first MCS level is identical to the second MCS level, the identification information includes ratio information between a transmission power of the second downlink data signal and a transmission power of the downlink signal for the paired UE.

10. The UE of claim 6, wherein the second control information includes a flag bit indicating whether the second downlink data signal is multiplexed with the downlink signal for the paired UE.

* * * * *